April 8, 1958  Y. H. KURKJIAN  2,829,646
CONTAINER AND CONTENTS EJECTING MEANS THEREFOR
Filed Aug. 8, 1952
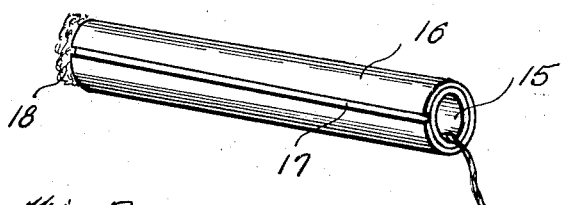
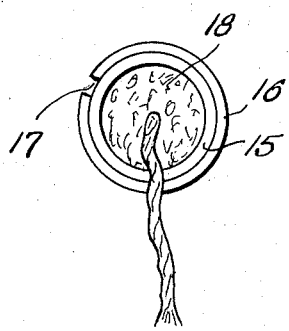
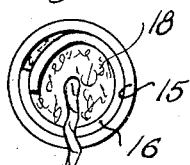
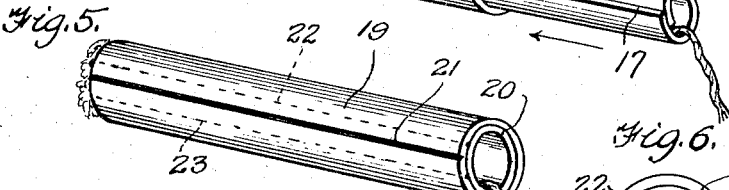
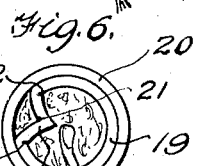
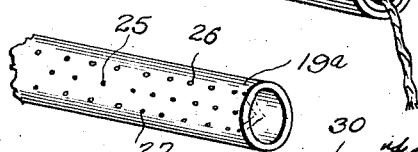
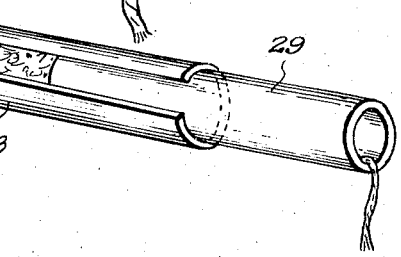
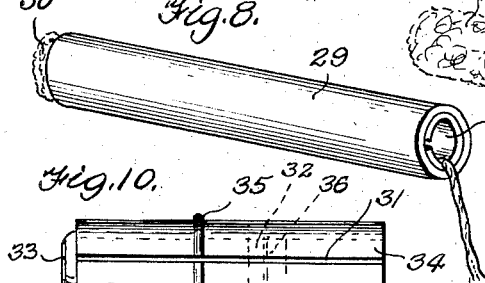
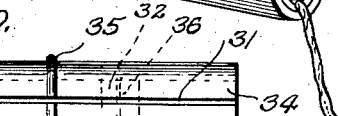
INVENTOR
YERVANT H. KURKJIAN
BY
HIS ATTORNEY United States Patent Office 2,829,646
Patented Apr. 8, 1958

2,829,646

CONTAINER AND CONTENTS EJECTING MEANS THEREFOR

Yervant H. Kurkjian, Clifton, N. J., assignor to Kurk Products Co., Clifton, N. J., a corporation of New Jersey Application August 8, 1952, Serial No. 303,258

2 Claims. (Cl. 128—263)

This invention relates to a container and ejecting means therefor, and has for one of its objects the production of a device which will occupy a minimum amount of space when assembled for packaging purposes.

A further object of this invention is the production of a simple and efficient container and a contents ejector means therefor, constituting companion elements which are adapted to fit one within the other to facilitate the ejection of the contents of the container when assembled in one selected manner, and which are adapted to fit one upon the other when assembled in another selected manner to occupy a minimum amount of space for packaging purposes, one of the elements being adjustable as to its diameter.

Other objects and advantages of this invention will appear throughout the following specification and claims.

In the drawing:

Figure 1 is a perspective view of one form of the invention in an encasing position;

Figure 2 is an end elevational view thereof;

Figure 3 is a perspective view of the container and ejector in an ejecting position;

Figure 4 is an end elevational view of the container and ejector in an ejecting position;

Figure 5 is a perspective view of a modified form of the container and ejector;

Figure 6 is an end elevational view of the form shown in Figure 5;

Figure 7 is a perspective view of a further modified form of the ejector;

Figure 8 is a perspective view of a further modified form with a split container and a circular ejector;

Figure 9 is a perspective view of the form shown in Figure 8 in an ejecting position;

Figure 10 is a side elevational view of a medicament container with a removable encasing ejector;

Figure 11 is a side elevational view, partly in section showing the ejector in an ejecting position within the medicament container;

Figure 12 is a transverse sectional view taken on line 12—12 of Figure 11.

By referring to the drawing, it will be seen that 15 designates an open ended tubular container in which is removably mounted a compressed absorbent sanitary element such as a tampon 18 of a conventional type to which is attached a conventional cord. An encasing tube 16, preferably of the same length as the container 15 is slidably and snugly fitted over the container 15, as shown in Figures 1 and 2. This tube 16 is preferably slit longitudinally, as at 17, to provide a tube which is adjustable as to its diameter so at to fit snugly around the container 15 or to be reduced as to its diameter to fit snugly and slidably within the container 15 to eject the tampon 18.

The container 15 which contains the tampon 18 fits within the expansible encasing tube 16 and may be wrapped and sealed within a suitable wrapper. The container 15 and tube 16 preferably are of the same length so as to occupy a minimum amount of space when assembled for packaging purposes. When using the article, the tube 16 is removed from the container 15 and is coiled or compressed to reduce its diameter so that it may snugly fit within the container 15. The tube 16 is then inserted into the tubular container 15 and moved longitudinally of the container for the purpose of ejecting the tampon 18 in the conventional manner. After using, the container 15 and tube 16 are both thrown away.

Due to the fact that the tube 16 fits snugly within the container 15, the tampon 18 which is a moisture absorbing agent, will not become wedged between the container 15 and the tube 16 as the tampon 18 absorbs moisture while the tube 16 or contractible element ejects the tampon 18 from the container 15.

One important feature of the present invention is the expansible, contractible, or adjustable member which may be adjusted as to its diameter in order to perform its proper function.

In Figure 5, there is shown a modified form of encasing and ejector tube 19 which is adjustable as to its diameter to initially encase the container and to then fit within the container. In this form, the container 20 is similar to the container 15, the tube 19 being scored exteriorly longitudinally as at 21, and interiorly, as at 22 and 23, so that the tube 19 may snugly fit upon the container for packaging purposes, and may be folded inwardly along the scored portions to produce an inwardly extending portion 24 to reduce the diameter thereof. The tube 19 may then be inserted into the container 20 for ejecting the tampon in the same manner as described above.

As is shown in Figure 7, the ejector tube 19a is provided with rows of perforations 25 to weaken the tube 19a along the parallel rows of perforations 26 and 27 so that a portion of the tube 19a may be folded inwardly in the same manner as that shown in Figure 6, to adjust the size of its diameter so as to fit within a container to eject a tampon therefrom.

As shown in Figures 8 and 9 the construction of the container and ejector is reversed so that the container 28 is a split tube and is adjustable as to its diameter or expansible to receive the tubular ejector 29. The container 28 contains the tampon 30 and for packaging purposes the container 28 fits within the ejector 29. The container 28 and ejector 29 are of the same length so as to take up a minimum amount of space for packaging purposes. When ejecting the tampon 30 the split tube container is expanded as to its diameter to receive the tubular ejector 29, as is shown in Figure 9.

In Figures 10 to 12, the same principle as shown in Figures 1 and 4 is illustrated as being applied to a medicament ejector cartridge wherein 31 designates the cartridge in which a sealing plunger 32 closes one end and a sealing disc 33 closes the opposite end thereof. An ejector 34 is removably fitted upon the cartridge 31 and is of the same length as the cartridge 31. The ejector 34 is provided with an annular bead 35 in spaced relation to one end thereof. The ejector 34 is adapted to be contracted as to its diameter and inserted in the cartridge 31 until the bead 35 abuts one end of the cartridge 31 to break the seal 36 of the plunger 32 and cartridge. The ejector 34 may then be moved further into the cartridge 31 for ejecting the medicament 37, as shown in dotted lines.

What is claimed as new is:

1. A tampon applicator of the class described comprising a container comprising a longitudinally split tube contractible as to its diameter adapted to contain a quantity of moisture absorbing ejectable material, a tubular element initially fitted around said container, and said tubular element defining an ejector element being insertable into said container to engage and eject said absorbing material and snugly fitting in said container for ejecting the ejectable material from said container when said tubular element is moved longitudinally of the container.

2. A tampon applicator of the class described comprising a container comprising a longitudinally split tube contractible as to its diameter adapted to contain a quantity of moisture absorbing ejectable material, a tubular element initially fitted around said container, and said tubular element defining an ejector element being insertable into said container to engage and eject said absorbing material and snugly fitting in said container for ejecting the ejectable material from said container when said tubular element is moved longitudinally of the container, the snug fitting of said element in said container preventing the wedging of the ejectable material between the element and container as the material absorbs moisture while being ejected from said container.

References Cited in the file of this patent

UNITED STATES PATENTS

| | | |
|---|---|---|
| 2,222,088 | Petersen | Nov. 19, 1940 |
| 2,450,138 | Harwood | Sept. 28, 1948 |

FOREIGN PATENTS

| | | |
|---|---|---|
| 577,692 | Great Britain | May 28, 1946 |
| 944,553 | France | Nov. 2, 1948 |
| 621,893 | Great Britain | Apr. 22, 1949 |